United States Patent
Huang-Fu et al.

(10) Patent No.: US 10,911,979 B2
(45) Date of Patent: Feb. 2, 2021

(54) AT COMMANDS FOR 5G SESSION MANAGEMENT

(71) Applicant: MEDIATEK INC., Hsin-Chu (TW)

(72) Inventors: Chien-Chun Huang-Fu, Hsin-Chu (TW); Chi-Hsien Chen, Hsin-Chu (TW); Po-Ying Chuang, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 123 days.

(21) Appl. No.: 16/371,416

(22) Filed: Apr. 1, 2019

(65) Prior Publication Data
US 2019/0313276 A1 Oct. 10, 2019

Related U.S. Application Data

(60) Provisional application No. 62/670,629, filed on May 11, 2018, provisional application No. 62/655,137, filed on Apr. 9, 2018.

(51) Int. Cl.
*H04W 28/02* (2009.01)
*H04W 80/10* (2009.01)
(Continued)

(52) U.S. Cl.
CPC ... *H04W 28/0268* (2013.01); *H04W 28/0273* (2013.01); *H04W 48/18* (2013.01); *H04W 76/20* (2018.02); *H04W 80/10* (2013.01)

(58) Field of Classification Search
None
See application file for complete search history.

(56) References Cited

U.S. PATENT DOCUMENTS

| | | | | |
|---|---|---|---|---|
| 2012/0082095 A1* | 4/2012 | Sun | ............... | H04W 72/0406 370/328 |
| 2013/0268689 A1* | 10/2013 | Leucht-Roth | ......... | H04L 1/0079 709/232 |

(Continued)

FOREIGN PATENT DOCUMENTS

| | | |
|---|---|---|
| CN | 105580340 A | 9/2013 |
| CN | 107548095 A | 6/2016 |

(Continued)

OTHER PUBLICATIONS

International Search Report and Written Opinion of International Search Authority for PCT/CN2019/081666 dated Jul. 9, 2019 (9 pages).

*Primary Examiner* — Shripal K Khajuria
(74) *Attorney, Agent, or Firm* — Imperium Patent Works; Zheng Jin

(57) ABSTRACT

A method of defining ATtention (AT) commands for 5G session management operations is proposed. In one example, the AT command can be a set command for configuring a PDU session establishment procedure. Additional 5G parameters including PDU session ID, Single-Network Slice Selection Assistance Information (S-NSSAI), Service and Session Continuity (SSC) mode, access type, and Reflective QoS (RQ) indication are defined for AT command +CGDCONT to configure the PDU session. In another example, the AT command can be a read command for querying PDU session and QoS flow parameters. Additional 5G parameters including PDU session ID (PSI), QoS flow ID (QFI), S-NASSI, SSC mode, access type, and RQ timer are defined for AT command +CGCONTRDP or +CGSCONTRDP.

20 Claims, 5 Drawing Sheets

(51) Int. Cl.
*H04W 48/18* (2009.01)
*H04W 76/20* (2018.01)

(56) References Cited

U.S. PATENT DOCUMENTS

| | | | |
|---|---|---|---|
| 2015/0085749 A1* | 3/2015 | Eravelli | H04L 41/0806 |
| | | | 370/328 |
| 2018/0035277 A1* | 2/2018 | Park | H04W 8/005 |
| 2019/0230515 A1* | 7/2019 | Quan | H04W 16/18 |

FOREIGN PATENT DOCUMENTS

| | | |
|---|---|---|
| CN | 107690161 A | 8/2016 |
| WO | WO2017200562 A1 | 5/2016 |
| WO | WO2018062949 A1 | 9/2016 |
| WO | WO2018063462 A1 | 9/2016 |

* cited by examiner

| COMMAND | POSSIBLE RESPONSE(S) |
|---|---|
| +CGDCONT=[<cid>[,<PDP_type>[,<APN>[,<PDP_addr>[,<d_comp>[,<h_comp>[,<IPv4AddrAlloc>[,<request_type>[,<P-CSCF_discovery>[,<IM_CN_Signalling_Flag_Ind>[,<NSLPI>[,<securePCO>[,<IPv4_MTU_discovery>[,<Local_Addr_Ind>[,<Non-IP_MTU_discovery>[,<Reliable_Data_Service>[,<SSC_mode>[,<S-NSSAI>[,<Access_type>[,<RQoS_Ind>[,<MH6-PDU>]]]]]]]]]]]]]]]]]]]]<br>(SET) | |
| +CGDCONT?<br>(READ) | [+CGDCONT: <cid>,<PDP_type>,<APN>,<PDP_addr>,<d_comp>,<h_comp>[,<IPv4AddrAlloc>[,<request_type>[,<P-CSCF_discovery>[,<IM_CN_Signalling_Flag_Ind>[,<NSLPI>[,<securePCO>[,<IPv4_MTU_discovery>[,<Local_Addr_Ind>[,<Non-IP_MTU_discovery>[,<Reliable_Data_Service>[,<SSC_mode>[,<S-NSSAI>[,<Access_type>[,<RQoS_Ind>[,<MH6-PDU>]]]]]]]]]]]]]]<br>[<CR><LF>+CGDCONT: <cid>,<PDP_type>,<APN>,<PDP_addr>,<d_comp>,<h_comp>[,<IPv4AddrAlloc>[,<request_type>[,<P-CSCF_discovery>[,<IM_CN_Signalling_Flag_Ind>[,<NSLPI>[,<securePCO>[,<IPv4_MTU_discovery>[,<Local_Addr_Ind>[,<Non-IP_MTU_discovery>[,<Reliable_Data_Service>[,<SSC_mode>[,<S-NSSAI>[,<Access_type>[,<RQoS_Ind>[,<MH6-PDU>]]]]]]]]]]]]]]<br>[...]] |
| +CGDCONT=?<br>(TEST) | +CGDCONT: (range of supported <cid>s),<PDP_type>,,,(list of supported <d_comp>s),(list of supported <h_comp>s),(list of supported <IPv4AddrAlloc>s),(list of supported <request_type>s),(list of supported <P-CSCF_discovery>s),(list of supported <IM_CN_Signalling_Flag_Ind>s),(list of supported <NSLPI>s),(list of supported <securePCO>s),(list of supported <IPv4_MTU_discovery>s),(list of supported <Local_Addr_Ind>s),(list of supported <Non-IP_MTU_discovery>s),(list of supported <Reliable_Data_Service>s)<br>[<CR><LF>+CGDCONT: (range of supported <cid>s),<PDP_type>,,,(list of supported <d_comp>s),(list of supported <h_comp>s),(list of supported <IPv4AddrAlloc>s),(list of supported <request_type>s),(list of supported <P-CSCF_discovery>s),(list of supported <IM_CN_Signalling_Flag_Ind>s),(list of supported <NSLPI>s),(list of supported <securePCO>s),(list of supported <IPv4_MTU_discovery>s),(list of supported <Local_Addr_Ind>s),(list of supported <Non-IP_MTU_discovery>s),(list of supported <Reliable_Data_Service>s),(list of supported <SSC_mode>s),(list of supported <Access_type>s),(list of supported <RQoS_Ind>s),(list of supported <MH6-PDU>s) |

FIG. 5

| COMMAND | POSSIBLE RESPONSE(S) |
|---|---|
| +CGCONTRDP[=<cid>]<br>(READ) | [+CGCONTRDP: <cid>,<bearer_id>,<apn>[,<local_addr and subnet_mask>[,<gw_addr>[,<DNS_prim_addr>[,<DNS_sec_addr>[,<P-CSCF_prim_addr>[,<P-CSCF_sec_addr>[,<IM_CN_Signalling_Flag>[,<LIPA_indication>[,<IPv4_MTU>[,<WLAN_Offload>[,<Local_Addr_Ind>[,<Non-IP_MTU>[,<Serving_PLMN_rate_control_value>[,<Reliable_Data_Service>[,<PS_Data_Off_Support>[,<PSI>,<QFI>[,<SSC_mode>[,<S-NSSAI>[,<Access_type>[,<RQ_timer>]]]]]]]]]]]]]]]]]]]<br>[<CR><LF>+CGCONTRDP: <cid>,<bearer_id>,<apn>[,<local_addr and subnet_mask>[,<gw_addr>[,<DNS_prim_addr>[,<DNS_sec_addr>[,<P-CSCF_prim_addr>[,<P-CSCF_sec_addr>[,<IM_CN_Signalling_Flag>[,<LIPA_indication>[,<IPv4_MTU>[,<WLAN_Offload>[,<Local_Addr_Ind>[,<Non-IP_MTU>[,<Serving_PLMN_rate_control_value>[,<Reliable_Data_Service>[,<PS_Data_Off_Support>[,<PSI>,<QFI>[,<SSC_mode>[,<S-NSSAI>[,<Access_type>[,<RQ_timer>]]]]]]]]]]]]]]]]]]]<br>[...]] |
| +CGCONTRDP=?<br>(TEST) | +CGCONTRDP: (list of <cid>s associated with active contexts) |

FIG. 6

| COMMAND | POSSIBLE RESPONSE(S) |
|---|---|
| +CGSCONTRDP[=<cid>]<br>(READ) | [+CGSCONTRDP: <cid>,<p_cid>,<bearer_id>[,<IM_CN_Signalling_Flag>[,<WLAN_Offload>[,<PSI>,<QFI>]]]<br>[<CR><LF>+CGSCONTRDP: <cid>,<p_cid>,<bearer_id>[,<IM_CN_Signalling_Flag>[,<WLAN_Offload>[,<PSI>,<QFI>]]]<br>[...]] |
| +CGSCONTRDP=?<br>(TEST) | +CGSCONTRDP: (list of <cid>s associated with active contexts) |

FIG. 7

AT COMMANDS FOR 5G SESSION MANAGEMENT

CROSS REFERENCE TO RELATED APPLICATIONS

This application claims priority under 35 U.S.C. § 119 from U.S. Provisional Application No. 62/655,137, entitled "5GSM Enhancement on Interworking," filed on Apr. 9, 2018; U.S. Provisional Application No. 62/670,629, entitled "Performance Enhancement on 5GSM," filed on May 11, 2018, the subject matter of which is incorporated herein by reference.

TECHNICAL FIELD

The disclosed embodiments relate generally to wireless communication in 5G networks, and, more particularly, to AT commands for 5G session management (5GSM) operations.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The Next Generation Mobile Network (NGMN) board, has decided to focus the future NGMN activities on defining the end-to-end requirements for 5G new radio (NR) systems.

In 5G, a Protocol Data Unit (PDU) session establishment procedure is a parallel procedure of a Packet Data Network (PDN) connection procedure in 4G. A PDU session defines the association between the UE and the data network that provides a PDU connectivity service. Each PDU session is identified by a PDU session ID, and may include multiple QoS flows and QoS rules. In 5G network, QoS flow is the finest granularity for QoS management to enable more flexible QoS control. The concept of QoS flow in 5G is like EPS bearer in 4G. Each QoS flow is identified by a QoS flow ID (QFI) which is unique within a PDU session. Each QoS rule is identified by a QoS rule ID (QRI). There can be more than one QoS rule associated with the same QoS flow. A default QoS rule is required to be sent to the UE for every PDU session establishment and it is associated with a QoS flow.

The 5G session management (5GSM) functionality can be provided towards the applications and the terminal devices using an Application Programming interface (API). Traditionally, for external applications, the EPS/IP bearer in LTE/4G networks and corresponding PDN connection management and resource allocation functionality may be provided through an AT command API in accordance with 3GPP TS 27.007 "AT command set for User Equipment (UE)". AT commands are used for controlling Mobile Termination (MT) functions and GSM/UMTS network services from a Terminal Equipment (TE) through Terminal Adaptor (TA). A solution is sought for defining AT commands for 5GSM operations, including PDP context, bearer context description for bearers in 5G and QoS parameters.

SUMMARY

A method of defining ATtention (AT) commands for 5G session management operations is proposed. A Protocol Data Unit (PDU) session defines the association between a UE and the data network that provides a PDU connectivity service. Each PDU session is identified by a PDU session ID, and may include multiple QoS flows and QoS rules. In one example, the AT command can be a set command for configuring a PDU session establishment procedure. Additional 5G parameters including PDU session ID, Single-Network Slice Selection Assistance Information (S-NSSAI), Service and Session Continuity (SSC) mode, access type, and Reflective QoS (RQ) indication are defined for AT command +CGDCONT to configure the PDU session. In another example, the AT command can be a read command for querying PDU session and QoS flow parameters. Additional 5G parameters including PDU session ID (PSI), QoS flow ID (QFI), S-NASSI, SSC mode, access type, and RQ timer are defined for AT command +CGCONTRDP or +CGSCONTRDP.

In one embodiment, a UE generates an Attention (AT) command by an Application Processor (AP) of the UE in a wireless network. The AT command comprises a context ID (CID) that identifies a PDU session. The AP provides the AT command to a modem of the UE via an AT command interface. The AT command comprises PDU session configuration information. The modem transmits a PDU session establishment request to the network. The request comprises PDU session parameters based on the PDU session configuration information provided by the AT command. The modem receives a PDU session establishment accept from the network in response to the request. In one example, the AT command is a set command +CGDCONT for configuring the PDU session parameters.

In another embodiment, a UE establishes a protocol data unit (PDU) session in a wireless network. The PDU session is configured with one or more QoS flows. An AP of the UE transmits an Attention (AT) command to a modem of the UE. The AT command is a read command for querying parameters of a QoS flow or the PDU session. The AT command comprises a context ID that identifies the QoS flow. The AP receives a response from the modem. The response comprises the parameters of the queried QoS flow or the queried PDU session.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 5 illustrates one embodiment of an AT command +CGDCONT for establishing a PDU session associated with a context identification (CID) in a 5G network in accordance with one novel aspect.

FIG. 6 illustrates one embodiment of an AT command +CGCONTRDP for retrieving a list of parameters of a QoS flow containing a default QoS rule in accordance with one novel aspect.

FIG. 7 illustrates one embodiment of an AT command +CGSCONTRDP for retrieving a list of parameters of a QoS flow not containing a default QoS rule in accordance with one novel aspect.

DETAILED DESCRIPTION

Reference will now be made in detail to some embodiments of the invention, examples of which are illustrated in the accompanying drawings.

Figure 1:
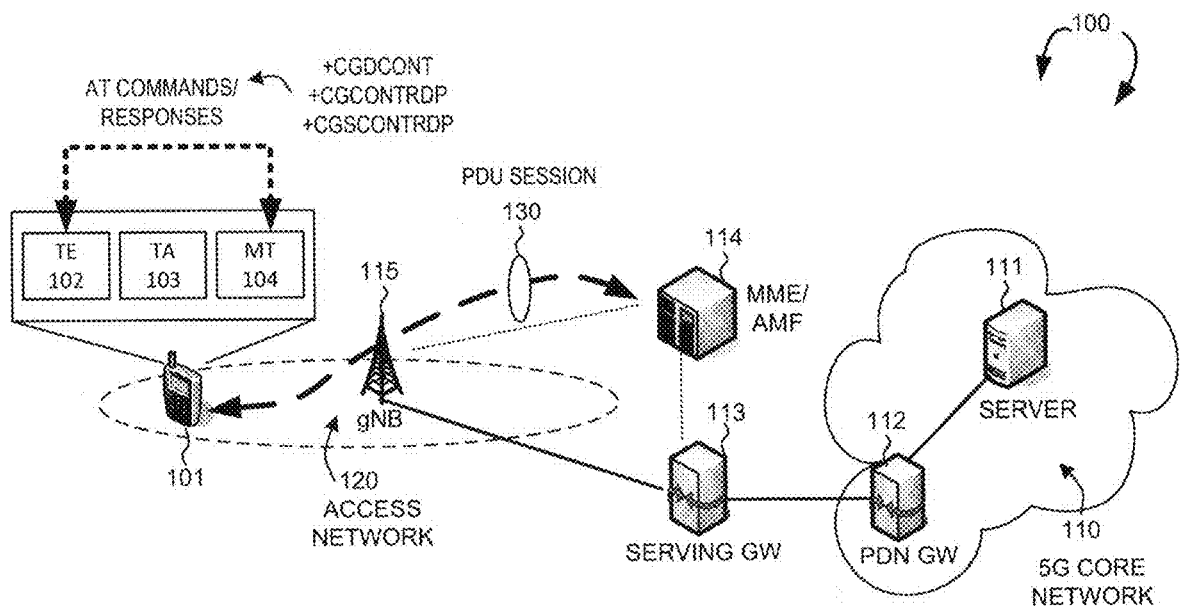
FIG. 1 illustrates a protocol data unit (PDU) session and related PDU session procedures via AT commands in a 5G new radio (NR) network in accordance with one novel aspect.

FIG. 1 illustrates a protocol data unit (PDU) session and related PDU session procedures via AT commands in a 5G new radio (NR) network 100 in accordance with one novel aspect. 5G NR network 100 comprises application server 111 that provides various services by communicating with a plurality of user equipments (UEs) including UE 101. In the example of FIG. 1, application server 111 and a packet data network gateway (PDN GW) 112 belong to part of a 5G core network 5GC 110. UE 101 and its serving base station gNB 102 belong to part of a radio access network RAN 120. RAN 120 provides radio access for UE 101 via a radio access technology (RAT). Application server 111 communicates with UE 101 through PDN GW 112, serving GW 113, and gNB 102. A mobility management entity (MME) or an access and mobility management function (AMF) 114 communicates with gNB 102, serving GW 113 and PDN GW 112 for access and mobility management of wireless access devices in 5G NR network 100. UE 101 may be equipped with a radio frequency (RF) transceiver or multiple RF transceivers for different application services via different RATs/CNs. UE 101 may be a smart phone, a wearable device, an Internet of Things (IoT) device, and a tablet, etc.

5G networks are packet-switched (PS) Internet Protocol (IP) networks. This means that the networks deliver all data traffic in IP packets, and provide users with Always-On IP Connectivity. When UE joins an 5G network, a Packet Data Network (PDN) address (i.e., the one that can be used on the PDN) is assigned to the UE for its connection to the PDN. In 4G LTE, EPS calls the UE's "IP access connection" an evolved packet system (EPS) bearer, which is a connection between the UE and the PDN GW. The PDN GW is the default gateway for the UE's IP access. EPS has defined a Default EPS Bearer to provide the IP Connectivity that is Always-On. In 5G, a PDU session establishment is a parallel procedure of PDN connection procedure in 4G. A PDU session, e.g., 130, defines the association between the UE and the data network that provides a PDU connectivity service. Each PDU session is identified by a PDU session ID, and may include multiple QoS flows and QoS rules. Each PDU session is configured with one default QoS rule (DQR).

The PDN connection/EPS bearer in 4G and the PDU session/QoS flow in 5G, and corresponding connection and session management functionality can be provided towards the applications and the terminal devices using an Application Programming interface (API) based on Packet Data Protocol (PDP) contexts. A PDP context can be regarded as a data record of parameters that characterize a specific bearer and connection to the target PDN. Multiple applications running on one UE may require multiple connections/sessions to one or more PDNs, so that multiple PDP contexts may have to be defined. These multiple PDP contexts can be grouped into primary PDP contexts (also referred to as non-secondary PDP contexts) and secondary PDP contexts. Multiple primary PDP contexts provide connections/sessions to different PDNs are each associated with a unique IP address.

For external applications, the connection and session management functionality may be provided through an AT command API in accordance with 3GPP TS 27.007 "AT command set for User Equipment (UE)". AT commands are used for controlling Mobile Termination (MT) functions and GSM/UMTS network services from a Terminal Equipment (TE) through Terminal Adaptor (TA). In the example of FIG. 1, UE 101 comprises a TE 102, a TA 103, and an MT 104. TE can use AT commands to control MT to perform connection and session management functionality. For example, TE can use AT commands for querying PDP context information and for setting PDP context parameters. 3GPP TS 27.007 defines a plurality of AT commands for controlling MT functions and GPRS packet domain services based on PDP contexts. Each AT command includes a Context Identification (CID) parameter as reference to the specific PDP context to which the AT command applies. The TA, MT and TE may be implemented in the form of separate or integrated entities as needed. The span of control of the defined AT commands allows handling of any physical implementation that may lead to: TA, MT and TE as three separate entities; TA integrated under the MT cover, and TE implemented as a separate entity; TA integrated under the TE cover, and MT implemented as a separate entity; and TA and MT integrated under the TE cover as a single entity.

In accordance with one novel aspect, AT command for establishing PDU sessions, creating QoS flows, and for querying QoS flow and QoS rule parameters are defined for 5G networks. In one embodiment, TE 102 sends an AT command to TA 103, which converts to an MT control to be sent to MT 104. The AT commands can be a read command or a set command. In response, MT 104 sends an MT status back to TA 103, which converts to a response to be sent to TE 102. Specifically, the AT command can be a set command for configuring and triggering a PDU session establishment procedure. For example, additional 5G parameters including Single-Network Slice Selection Assistance Information (S-NSSAI), Service and Session Continuity (SSC) mode, Reflective QoS (RQ) indication, access type, and max number of packet filters supported are defined for AT command +CGDCONT, which configures parameters for PDU session establishment. The AT command can be a read command for querying PDU session and QoS flow parameters. For example, additional 5G parameters including PDU session ID (PSI), QoS flow ID (QFI), S-NASSI, SSC mode, RQ timer, and access type are defined for AT command +CGCONTRDP/+CGSCONTRDP, which queries PDU/QoS parameters.

Figure 2:
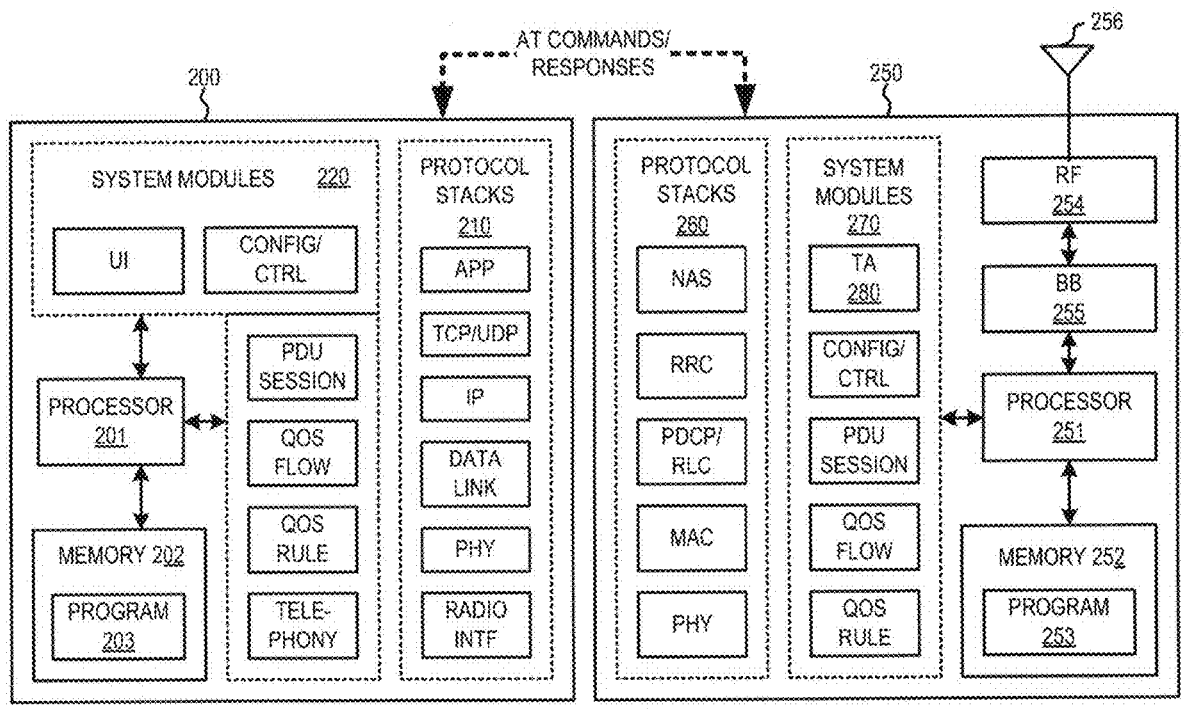
FIG. 2 illustrates a simplified block diagram of an architecture comprising a Terminal Equipment (TE) and a Mobile Termination (MT) in accordance with one novel aspect.

FIG. 2 illustrates a simplified block diagram of an architecture comprising a Terminal Equipment (TE) and a Mobile Termination (MT) in accordance with one novel aspect. TE 200 comprises a processor 201, memory 202, and protocol stacks 210 including Application (APP) layer, Transport (TCP/UDP) layer, Network (IP) layer, Data Link layer, and Physical (PHY) layer. TE 200 further comprises system control modules and circuits 220 including a user interface, a configuration and control module, a PDU session handler, a QoS flow handler, a QoS rule handler, and a telephony module. Processor 201 processes different applications and invokes different system control modules to perform various features of TE 200. Memory 202 stores program instructions and data 203 to control the operations of TE 200. The system control modules and circuits can be implemented and configured to carry out functional tasks of TE 200. Note that TE is also referred to as Application Processor (AP). Typically, TE 200 is also equipped with telephony framework circuits (e.g., a dialer, a call manager etc.) to support voice call functionality. In addition, TE 200 also supports the AT commands as defined by 3GPP TS27.007 for controlling MT functions and GPRS packet domain services based on PDP contexts for each PDU session identified by CID.

MT 250 has an antenna 256, which transmits and receives radio signals. A RF transceiver module 254, coupled with the antenna, receives RF signals from antenna 256, converts them to baseband signals and sends them to processor 251 via baseband module 255. RF transceiver 254 also converts received baseband signals from processor 251 via baseband module 255, converts them to RF signals, and sends out to antenna 256. Processor 251 processes the received baseband signals and invokes different functional modules to perform features in MT 250. Memory 252 stores program instructions and data 253 to control the operations of MT 250. MT 250 also comprises a set of protocol stacks 260 and control circuits including various system modules 270 to carry out functional tasks of MT 250. Protocol stacks 260 comprises Non-Access-Stratum (NAS) layer, Radio Resource Control (RRC) layer, Packet Data Convergence Protocol/Radio Link Control (PDCP/RLC) layer, Media Access Control (MAC) layer, and Physical (PHY) layer. System modules 270 comprises a configuration module, a control module, a PDU session handler, a QoS flow handler, and a QoS rule handler. MT is also referred to as modem. In the example of FIG. 2, MT 250 further comprises a Terminal Adaptor (TA 280) that receives and transmits AT commands and converts the AT commands to be processed by processor 251 for controlling MT functions. In one example, TA 280 receives an AT set command from a TE for establishing a PDU session with the network. In another example, TA 280 receives an AT read command from a TE for the MT to provide PDU and QoS parameters to the TE.

Figure 3:
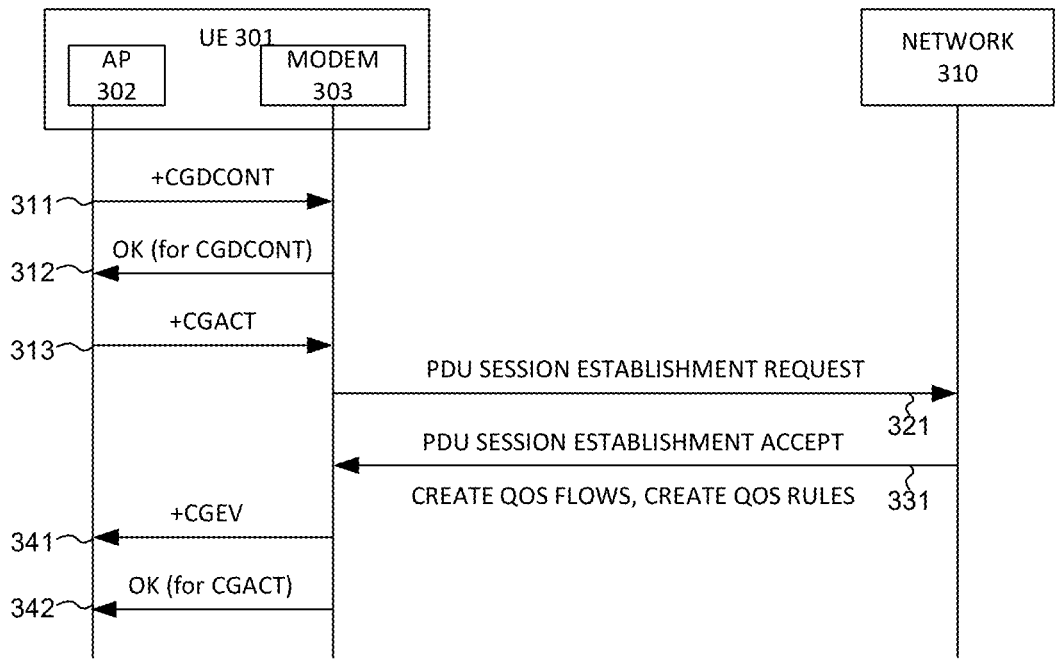
FIG. 3 illustrates a PDU session establishment procedure configured and triggered by AT command +CGDCONT and +CGACT in a 5G network in accordance with one novel aspect.

FIG. 3 illustrates a PDU session establishment procedure configured and triggered by AT command +CGDCONT and +CGACT in a 5G network in accordance with one novel aspect. Network 310 provides PDU connectivity service to UE 301 via a PDU session. UE 301 comprises an AP 302 and a modem 303, communicating with each other via AT commands. In the example of FIG. 3, AP 302 uses AT commands for controlling modem 303 to establish a PDU session. In step 311, AP 302 sends an AT configuration command +CGDCONT to modem 303 to set the parameters needed for the PDU session, and receives OK from modem 303 (step 312). AP 302 then sends another AT action command +CGACT to modem 303 to trigger the PDU session establishment procedure (step 313). AT command +CGDCONT comprises a <cid> provided by the AP. The <cid> is used to identify the PDP context as the PDU session ID and the QoS flow ID to which the AT command applies between AP and modem. When establish the PDU session, the <cid> is allocated by AP to be associated with the QoS flow of the default QoS rule of the PDU session to be established. In addition to legacy parameters applicable to 4G LTE network, some of the parameters are introduced for 5G NR network, including S-NSSAI, SSC mode, access type, RQoS indication, and max number of packet filters supported. Upon receiving the +CGACT command, in step 321, modem 303 sends a PDU session establishment request to network 310. In step 331, modem 303 receives a PDU session establishment accept from network 310. In step 341, modem 303 sends a response +CGEV back to AP 302 and completes the PDU session establishment. In step 342, modem 303 send a result: OK or ERROR to complete the whole AT command procedure.

Figure 4:
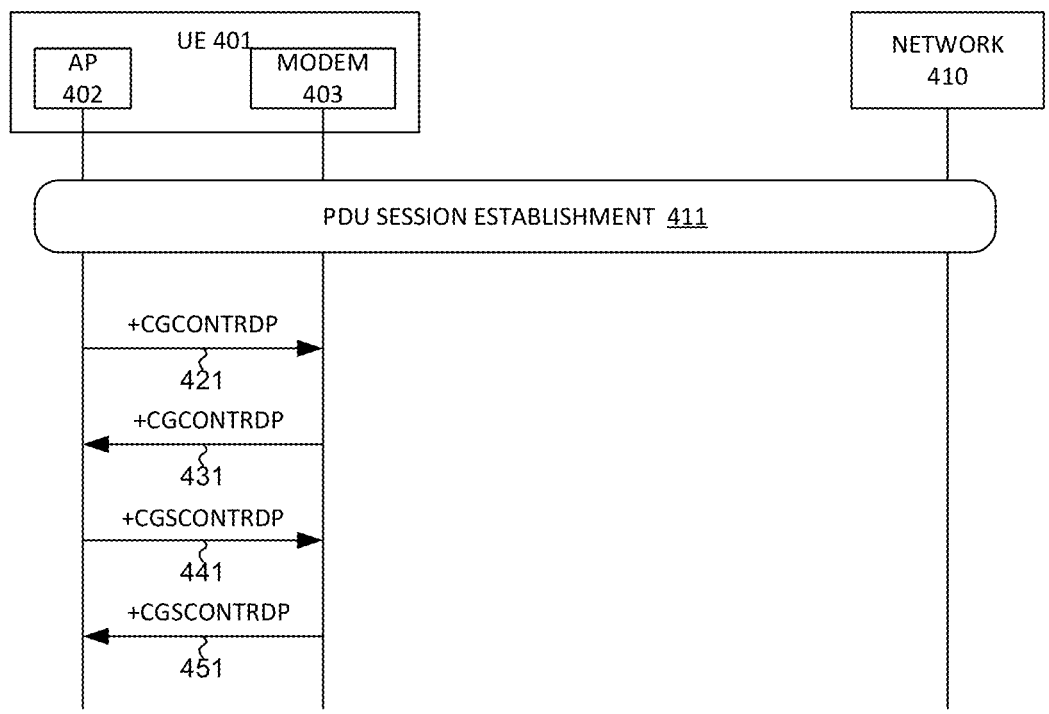
FIG. 4 illustrates AT command +CGCONTRDP and +CGSCONTRDP in a 5G network for querying PDU session and QoS flow parameters in accordance with one novel aspect.

FIG. 4 illustrates AT command +CGCONTRDP and +CGSCONTRDP in a 5G network for querying PDU session and QoS flow parameters in accordance with one novel aspect. Network 410 provides PDU connectivity service to UE 401 via a PDU session. UE 401 comprises an AP 402 and a modem 403, communicating with each other via AT commands. In the example of FIG. 4, AP 402 uses AT commands for retrieving parameters of an established PDU session. In step 411, UE 401 establishes a PDU session with network 410. The PDU session is configured with one or more QoS flows and one or more QoS rules. One of the QoS rule is a default QoS rule (DQR) and is associated with one QoS flow. In step 421, AP 402 sends an AT read command +CGCONTRDP to modem 403 for querying PDU and QoS parameters associated with a context ID <cid>. The <cid> here is served as an index between AP and modem to identify a QoS flow that is associated with the default QoS rule of the PDU session. Hence here AP would use <cid> to query the information of the PDU session and QoS flow, and the modem would map the <cid> to the corresponding PSI and QFI, and respond queried parameters accordingly. The queried QoS flow is associated with the default QoS rule. The queried parameters thus include S-NSSAI, SSC mode, access type, and RQ timer applicable to all QoS flows of the same PDU session. In step 431, modem 403 replies back the queried parameters. The modem would reply by +CGCONTRDP, the modem would also reply an OK as the result. In step 441, AP 402 sends an AT read command +CGSCONTRDP to modem 403 for querying parameters associated with a <cid>. The <cid> here is served as an index between AP and modem to identify a QoS flow that is not associated with the default QoS rule of the PDU session. Hence here AP would use <cid> to query the information of the PDU session and QoS flow, and the modem would map the <cid> to the corresponding PSI and QFI, and respond queried parameters accordingly. The queried QoS flow is not associated with the default QoS rule. The queried parameters thus are applicable to this QoS flow only. In step 451, modem 403 replies back the queried parameters. The modem would reply by +CGSCONTRDP, the modem would also reply an OK as the result.

FIG. 5 illustrates one embodiment of an AT command +CGDCONT for establishing a PDU session having a list of Packet Data Protocol (PDP) context parameters in accordance with one novel aspect. As illustrated in FIG. 5, the AT +CGDCONT command is a set or read or test command. The set command specifies PDP context parameters values for a PDP context identified by the local context identifier parameter <cid>, and also allows the TE to specify whether security protected transmission of ESM information is requested, because the PCO can include information that requires ciphering. There can be other reasons for the UE to use security protected transmission of ESM information, e.g., if the UE needs to transfer an APN. The number of PDP contexts that may be in a defined state at the same time is given by the range returned by the test command. The execution of the read command returns the current settings for each defined context. The execution of the test command returns values supported as compound values. If the MT supports several PDP types, <PDP_type>, the parameter value ranges for each <PDP_type> are returned on a separate line.

The defined values of the relevant information include: <cid>: specifies a particular PDP context definition; <PDP_type>: specifies the type of packet data protocol; <APN>: a logical name that is use to select the packet data network; <PDP_addr>: identifies the MT in the address space applicable to the PDP; <d_comp>: controls PDP data compression; <h_comp>: controls PDP header compression; <IPv4AddrAlloc>: controls how the MT/TA requests to get the IPv4 address information; <request_type>: indicates the type of PDP context activation request for the PDP context; <P-CSCF_discovery>: influences how the MT/TA requests to get the P-CSCF address; <IM_CN_Signaling_Flag_Ind>: indicates to the network whether the PDP context is for IM CN subsystem-related signaling only or not; <NSLPI>: indicates the NAS signaling priority requested for this PDP context; <securePCO>: specifies if security protected transmission of PCO is requested or not; <IPv4_MTU_discovery>: influences how the MT/TA requests to get the IPv4 MTU size; <local_Addr_Ind>: indicates local address; <Non-IP MTU_discovery>: influences MTU discovery for non-IP packets; <Reliable_Data_service>: indicates reliable data service; <SSC_mode>: indicates the support of SSC mode for continuity requirements of different applications and services for UE; <S-NSSAI>: identifies a network slice with which the PDU session is associated; <Access_type>: indicates 3GPP or non-3GPP access; <RQoS_Ind>: indicates whether UE can map uplink user plane traffic to QoS flows without SMF provided QoS rules; and <MH6-PDU>: indicates the maximum number of packet filters that can be supported by UE for the PDU session.

FIG. 6 illustrates one embodiment of an AT command +CGCONTRDP for acquiring a list of Packet Data Protocol (PDP) context parameters including QoS flow parameters of a QoS flow in accordance with one novel aspect. The queried QoS flow contains a default QoS rule. As illustrated in FIG. 6, the AT +CGCONTRDP command is a read or test command. The execution of the read command returns the relevant information for an active non-secondary PDP context with the context identifier <cid>. If the parameter <cid> is omitted in the AT command, then the relevant information for all active non-secondary PDP contexts is returned. The execution of the test command returns a list of <cid> s associated with active non-secondary PDP contexts.

The defined values of the relevant information include: <cid>: a particular non-secondary PDP context identifier used by AP to indicate which QoS flow (associated with the default QoS rule) it is querying; <bearer-id>: identifiers the EPS bearer; <apn>: a logical name that was used to select the packet data network; <local_addr and subnet_mask>: shows the IP address and subnet mask of the MT; <gw_addr>: shows the Gateway Address of the MT; <DNS_prim_addr>: shows the IP address of the primary DNS server; <DNS_sec_addr>: shows the IP address of the secondary DNS server; <P_CSCF_prim_addr>: shows the IP address of the primary P-CSCF server; <P_CSCF_sec_addr>: shows the IP address of the secondary P-CSCF server; <IM_CN_Signaling_Flag>: shows whether the PDN context is for IM CN subsystem-related signaling only or not; <LIPA_indication>: indicates that the PDP context provides connectivity using LIPA PDN connection; and <IPv4_MTU>: shows the IPv4 MTU size in octets; <WLAN_Offload>: indicates whether WLAN offload is enabled; <Local_Addr_ind>: indicates local address; <Non-IP_MTU>: shows non-IP MTU size; <Serving_PLMN_rate_control_value>: shows serving PLMN rate control; <Reliable_Data_Service>: shows reliable data service; <PS_Data_Off_Support>: indicates PS data off support; <PSI>: indicates PDU session ID, <QFI>: indicates QoS flow ID; <SSC_mode>: indicates the support for SSC mode; <S-NSSAI>: identifies a network slice with which the PDU session is associated; <Access_type>: indicates 3GPP or non-3GPP access; <RQ_timer>: indicates timer for reflective QoS.

FIG. 7 illustrates one embodiment of an AT command +CGSCONTRDP for acquiring a list of Packet Data Protocol (PDP) context parameters including QoS flow parameters of a QoS flow in accordance with one novel aspect. The queried QoS flow does not contain a default QoS rule. As illustrated in FIG. 7, the AT +CGSCONTRDP command is a read or test command. The execution of the read command returns the relevant information for an active non-secondary PDP context with the context identifier <cid>. If the parameter <cid> is omitted in the AT command, then the relevant information for all active non-secondary PDP contexts is returned. The execution of the test command returns a list of <cid> s associated with active non-secondary PDP contexts.

The defined values of the relevant information include: <cid>: a particular non-secondary PDP context identifier used by AP to indicate which QoS flow (not associated with the default QoS rule) it is querying; <p_cid>: is the ID of the QoS flow of the default QoS rule of the PDU session; <bearer-id>: identifiers the EPS bearer; <IM_CN_Signaling_Flag>: indicates IP multimedia core network signaling flag; <WLAN_Offload>: indicates whether WLAN offload is enabled; <PSI>: PDU session ID; <QFI>: QoS flow ID.

Figure 8:
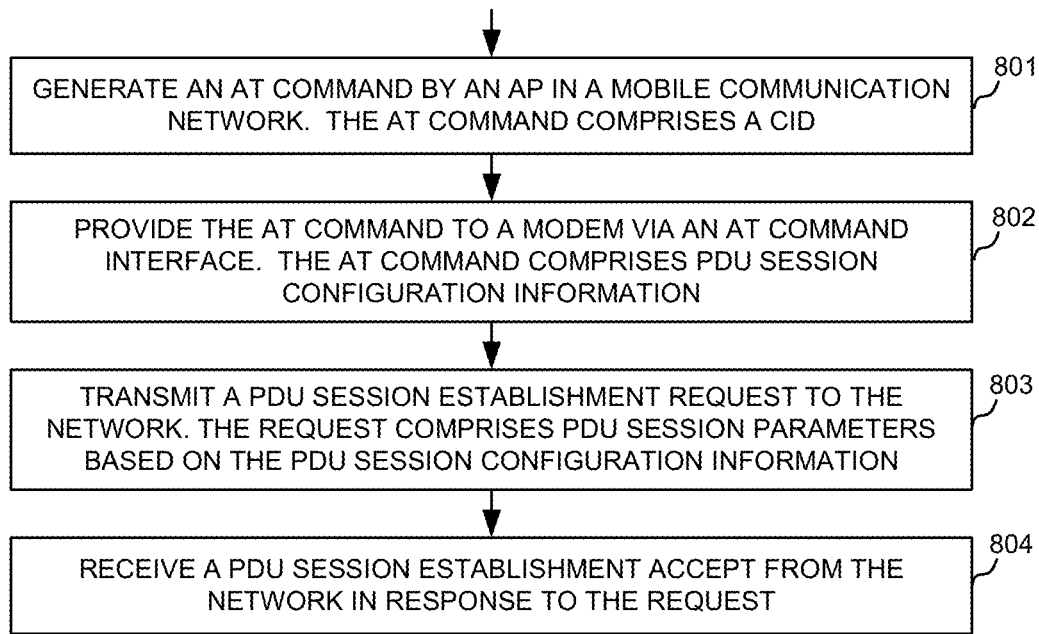
FIG. 8 illustrates a flow chart of a method of establishing PDU session via AT commands by a UE in accordance with one novel aspect.

FIG. 8 illustrates a flow chart of a method of establishing PDU session by a UE in accordance with one novel aspect. In step 801, the UE generates an Attention (AT) command by an Application Processor (AP) of the UE in a wireless network. The AT command comprises a context ID (CID) of a protocol data unit (PDU) session ID. In step 802, the AP provides the AT command to a modem of the UE via an AT command interface. The AT command comprises PDU session configuration information. In step 803, the modem transmits a PDU session establishment request to the network. The request comprises PDU session parameters based on the PDU session configuration information provided by the AT command. In step 804, the modem receives a PDU session establishment accept from the network in response to the request. In one example, the AT command is a set command +CGDCONT for configuring the PDU session parameters.

Figure 9:
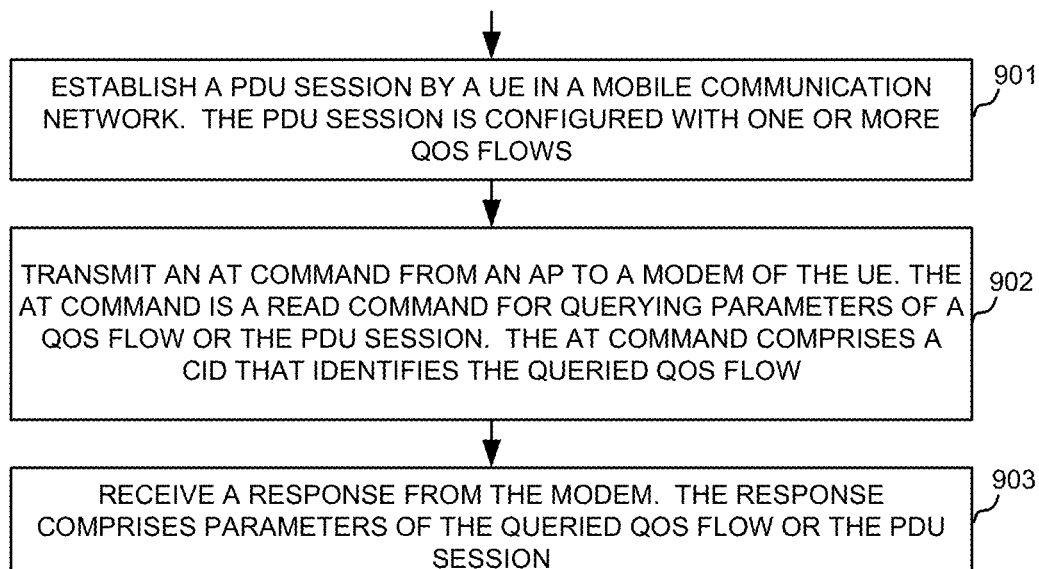
FIG. 9 illustrates a flow chart of a method of querying PDN and QoS parameters of a PDU session via AT commands by a UE in accordance with one novel aspect.

FIG. 9 illustrates a flow chart of a method of querying PDN and QoS parameters of a PDU session by a UE in accordance with one novel aspect. In step 901, the UE establishes a protocol data unit (PDU) session in a wireless network. The PDU session is configured with one or more QoS flows. In step 902, an AP of the UE transmits an Attention (AT) command to a modem of the UE. The AT command is a read command for querying the parameters of a QoS flow or the PDU session. The AT command comprises a context ID (CID) of the queried QoS flow. In step 903, the AP receives a response from the modem. The response comprises parameters of the queried QoS flow or the queried PDU session.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   generating an Attention (AT) command by an Application Processor (AP) of a User Equipment (UE) in a wireless network, wherein the AT command comprises a context ID (CID);
   providing the AT command by the AP to a modem of the UE via an AT command interface, wherein the AT command comprises PDU session configuration information;
   transmitting a PDU session establishment request from the modem to the network, wherein the request comprises PDU session parameters based on the PDU session configuration information provided by the AT command; and
   receiving a PDU session establishment accept from the network in response to the request.

2. The method of claim 1, wherein the AT command is a set command +CGDCONT for configuring the PDU session parameters.

3. The method of claim 2, wherein the AP provides a second AT command +CGACT to trigger the PDU session establishment request transmission by the modem.

4. The method of claim 1, wherein the AT command further comprises Single-Network Slice Selection Assistance information (S-NSSAI).

5. The method of claim 1, wherein the AT command further comprises a Session and Service Continuity (SSC) mode.

6. The method of claim 1, wherein the AT command further comprises a Reflective QoS indication.

7. The method of claim 1, wherein the AT command further comprises an access type indicating 3GPP access or non-3GPP access.

8. A User Equipment (UE), comprising:
   an Application Processor (AP) that generates an Attention (AT) command in a wireless network, wherein the AT command comprises a context ID (CID);
   a mobile terminal (MT) that receives the AT command via an AT command interface, wherein the AT command comprises PDU session configuration information;
   a transmitter that transmits a PDU session establishment request from the modem to the network, wherein the request comprises PDU session parameters based on the PDU session configuration information provided by the AT command; and
   a receiver that receives a PDU session establishment accept from the network in response to the request.

9. The UE of claim 8, wherein the AT command is a set command +CGDCONT for configuring the PDU session parameters.

10. The UE of claim 9, wherein the AP provides a second AT command +CGACT to trigger the PDU session establishment request transmission by the modem.

11. The UE of claim 8, wherein the AT command further comprises Single-Network Slice Selection Assistance information (S-NSSAI).

12. The UE of claim 8, wherein the AT command further comprises a Session and Service Continuity (SSC) mode.

13. The UE of claim 8, wherein the AT command further comprises a Reflective QoS indication.

14. The UE of claim 8, wherein the AT command further comprises an access type indicating 3GPP access or non-3GPP access.

15. A method comprising:
   establishing a protocol data unit (PDU) session by a user equipment (UE) in a wireless network, wherein the PDU session is configured with one or more QoS flows;
   transmitting an Attention (AT) command from an Application Processor (AP) of the UE to a modem of the UE, wherein the AT command is a read command for querying the parameters of a QoS flow or the PDU session, wherein the AT command comprises a context ID (CID) of the queried QoS flow; and
   receiving a response from the modem, wherein the response comprises the parameters of the queried QoS flow or the queried PDU session.

16. The method of claim 15, wherein each of the multiple QoS flow contains or more QoS rules, and wherein only one QoS flow contains a default QoS rule.

17. The method of claim 16, wherein the queried QoS flow contains the default QoS rule, and wherein the AT command is AT +CGCONTRDP.

18. The method of claim 17, wherein the response comprises QoS parameters applicable to other QoS flows of the PDU session including Single-Network Slice Selection Assistance information (S-NSSAI), a Session and Service Continuity (SSC) mode, an access type, and a reflective QoS timer.

19. The method of claim 16, wherein the queried QoS flow does not contain the default QoS rule, and wherein the AT command is +CGSCONTRDP.

20. The method of claim 19, wherein the response comprises QoS parameters applicable to the queried QoS flow only.

\* \* \* \* \*